US008114189B2

(12) United States Patent
Rhodes et al.

(10) Patent No.: US 8,114,189 B2
(45) Date of Patent: Feb. 14, 2012

(54) METHOD FOR TREATING IRON IN A SILVER RECOVERY PROCESS

(75) Inventors: Curtis Rhodes, Albuquerque, NM (US); Christa Hockensmith, Socorro, NM (US); Deidre Hirschfeld, Socorro, NM (US)

(73) Assignee: ARS Services, LLC, Albuquerque, NM (US)

( * ) Notice: Subject to any disclaimer, the term of this patent is extended or adjusted under 35 U.S.C. 154(b) by 585 days.

(21) Appl. No.: 12/271,184

(22) Filed: Nov. 14, 2008

(65) Prior Publication Data

US 2010/0122956 A1 May 20, 2010

(51) Int. Cl.
*C02F 1/52* (2006.01)
*C02F 1/70* (2006.01)
*C22B 11/00* (2006.01)

(52) U.S. Cl. ................ 75/733; 75/710; 75/711; 75/713; 75/724; 75/732; 210/702; 210/719; 210/723; 210/728; 423/659

(58) Field of Classification Search .................... 75/713, 75/724, 733, 710, 711, 732; 210/719, 723, 210/724, 728, 702; 423/42, 659
See application file for complete search history.

(56) References Cited

U.S. PATENT DOCUMENTS

| | | | | |
|---|---|---|---|---|
| 3,433,739 | A * | 3/1969 | Newman | 210/698 |
| 5,462,670 | A * | 10/1995 | Guess | 210/713 |
| 5,603,890 | A | 2/1997 | Fuller | |
| 5,626,816 | A | 5/1997 | Fournier | |
| 6,096,209 | A | 8/2000 | O'Brien et al. | |
| 6,991,669 | B1 * | 1/2006 | Partridge et al. | 75/313 |
| 7,297,257 | B1 * | 11/2007 | Terry | 210/198.1 |

OTHER PUBLICATIONS

Applicant admitted prior art comprising paragraph 0004 of applicant's specification.*

* cited by examiner

*Primary Examiner* — Jerry Lorengo
*Assistant Examiner* — Jared Wood
(74) *Attorney, Agent, or Firm* — Locke Lord LLP

(57) ABSTRACT

A method of reducing or preventing the amount of iron sludge or precipitate that forms as a result of the recovery of silver from chemical solutions, such as a standard photographic solution. The method generally involves the introduction of a source of a conjugate organic base, such as a weak organic acid like citric acid or a salt of the conjugate organic base like a citrate salt, to the chemical fluid either before or during the silver recovery process. Preferably the source of conjugate organic base is introduced by combining it with a binder to form a time release cake or placing it in a container that has a semipermeable membrane that maintains the concentration of the conjugate organic base in the chemical fluid from about 0.2 to about 78 milimolar over a period of time.

23 Claims, 1 Drawing Sheet

FIG. 1
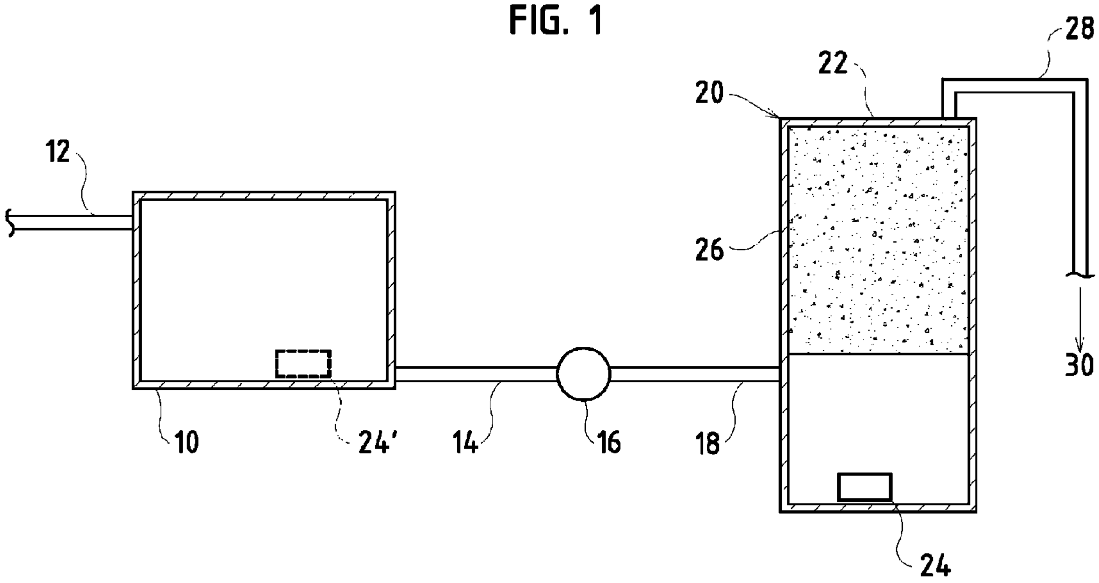
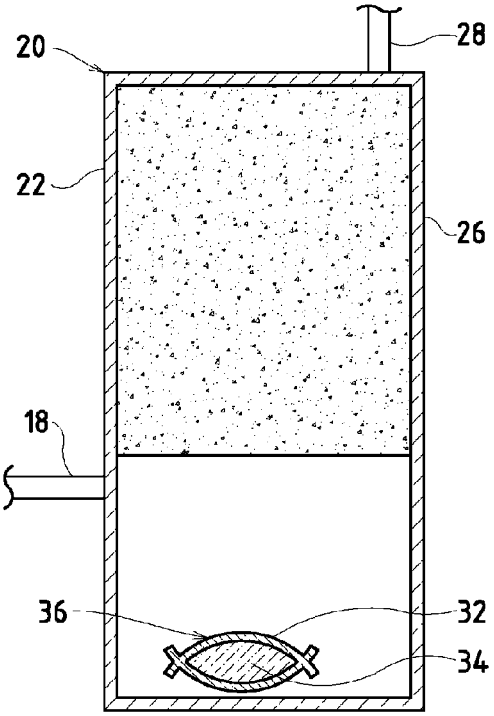
FIG. 2
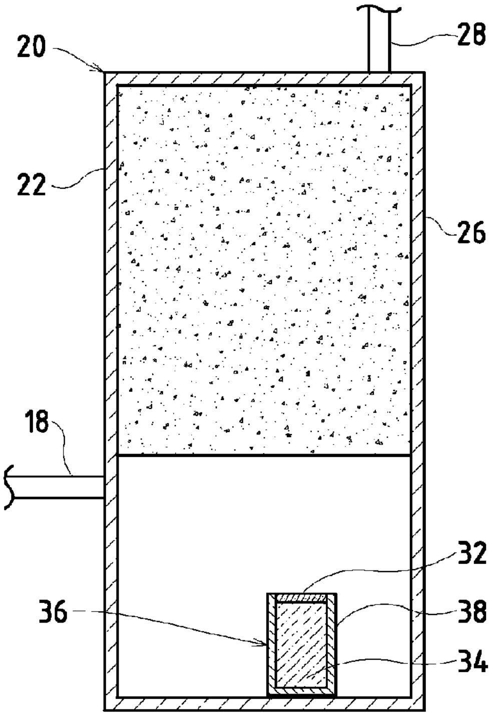
FIG. 3

METHOD FOR TREATING IRON IN A SILVER RECOVERY PROCESS

BACKGROUND

1. Field of the Invention

The invention relates to a method of treating iron in a silver recovery process, and more particularly a method of preventing the formation of iron sludge or precipitate in a silver recovery process, such as is used on standard photographic solutions.

2. Related Art

There are many chemical processes, particularly those related to photographic processing, that result in waste fluids that contain a significant amount of dissolved silver. As silver is a semiprecious metal, it is generally economically beneficial to remove the silver from the waste fluid prior to disposal. In addition, silver is a regulated material. Consequently, there are limits to the amount of silver that can be present in fluids that are discharged into sewer systems. As a result, there is both an economic and environmental incentive to recover the dissolved silver from these waste fluids.

There are a number of silver recovery methods that are known to those of skill in the art. In the photographic processing field, the recovery process often involves a metal recovery canister in which a metal replacement medium, such as steel wool, is contained. The chemical fluid, such as a standard photochemical solution containing silver, is passed through the metal recovery canister and then sent via a drain to the sewer system. The recovery process is an ion exchange process that releases iron out of the container as the silver is recovered. The silver forms a black sludge-like precipitate that remains in the canister. When the canister has either processes a certain amount of photochemical solution or once a certain amount of silver has been recovered, the canister is replaced with a fresh canister. One example of such a metal recovery canister is described as well as a discussion of others recovery methods in U.S. Pat. No. 6,096,209, the contents of which are hereby incorporated herein for its discussion of the background, criteria and discussion of various silver recovery technologies.

One issue regarding the use of metal recovery canisters is that, while the silver is removed from the chemical fluid, the iron that is released will form a sludge or precipitate in the drain lines and other components down stream from the metal recovery canister. One way of handling this problem has been to use a mechanical router to remove the iron from the drain line periodically, such as once a year. Another way of handling it has been to frequently rinse the drain line to prevent the iron sludge or precipitate from building up. Some companies have sold a dry powder that when mixed with water creates an acidic slurry that redissolves the iron compounds and keeps them in solution. One such dry powder is available from Academy Corporation of Albuquerque N. Mex. under the name Rustbuster.® However, most users of metal recovery canisters are not willing to use an acid slurry. A couple of years ago there was also a product introduced to the market that kept the iron in solution. Unfortunately, the U.S. Environmental Protection Agency (EPA) deemed the material to be hazardous. Therefore, there is still a need for a method to prevent the iron deposits in the drain line that uses a non-hazardous material and does not require an acid slurry.

SUMMARY OF THE INVENTION

A method of reducing or preventing the amount of iron sludge or precipitate that forms as a result of the recovery of silver from chemical solutions, such as a standard photographic solution. The method generally involves the introduction of a source of a conjugate organic base, such as a weak organic acid like citric acid or a salt of the conjugate organic base like powdered citrate, to the chemical fluid either before or during the silver recovery process. Preferably the source of conjugate organic base is introduced in a manner that maintains the concentration of the conjugate organic base in the chemical fluid from about 0.2 to about 78 milimolar over a period of time.

In a preferred embodiment, the source of conjugate organic base is introduced by combining it with a binder/time release agent to form a time release cake that can be added to a holding tank or metal recovery canister containing the chemical solution being treated. In a second preferred embodiment, a saturated solution of a source of conjugate organic base is placed in a container that has a semipermeable membrane that slowly allows the source of conjugate organic base to pass through the membrane and into the chemical solution. In a third preferred embodiment, dry powdered source of conjugate organic base is added to a holding tank containing the chemical solution prior to its treatment to recover the dissolved silver.

In another aspect of the invention, a metal recovery canister used for removing silver from standard photographic solution is modified by adding a source of conjugate organic base that contacts the standard photographic solution when it is inside the canister. As discussed above, preferred ways of accomplishing this include the use of a time release cake or a container with a semipermeable membrane. It is preferred that whatever method is chosen, sufficient source of conjugate organic base is used so that it does not need to be replenished during the normal service life of the metal recovery canister.

BRIEF DESCRIPTION OF DRAWINGS

The preferred embodiments of the current invention are further described and explained in relation to the following figures, wherein:

FIG. 1 is a representation of a preferred embodiment of the invention in which a time release cake containing a source of a conjugate organic base is located in either the metal recovery canister or the holding tank.

FIG. 2. is an alternative version of the metal recovery canistery shown in FIG. 1 according to a second preferred embodiment of the current invention in which the source of a conjugate organic base is contained in a bag formed by a permeable membrane.

FIG. 3 is a second alternate version of the metal recovery canistery shown in FIG. 1 according to a third preferred embodiment where the source of a conjugate organic base is contained in a separate container in the metal recovery canister that has an opening covered by a permeable membrane.

DETAILED DESCRIPTION OF THE PREFERRED EMBODIMENTS

The invention will be discussed below in the context of its use in connection with the recovery of silver from a standard photographic solution. However, one of skill in the art will recognize that the method is equally applicable to other chemical fluids from which dissolved silver or other metals is to be recovered.

In photographic processing, there are generally two different effluent waste streams. First, there is a fixer solution that is used to develop the film. Second, there is a bleach solution that is used to transfer the photographic image to the paper. Each of these effluent streams may contain silver that is required or desired to be recovered. In most photographic processing, these two effluent streams are combined prior to being further treated or disposed. This combined solution is generally referred to as standard photographic solution or Bleach/Fix solution. The fixer solution is generally acidic and the bleach solution is generally basic. The resulting standard photographic solution has a basic pH. In some more modern cases a dry printing process, such as an ink jet or dye sublimation printer is used to transfer the photographic image to paper. In this case there would only be the acidic fixer solution that needs to be treated.

It has been found that the addition of a source of conjugate organic base to a standard photographic solution before it comes into contact with the metal replacement material, such as steel wool, in the metal recovery canister will prevent the iron that is released from precipatating out of solution in the drain. A conjugate organic base is the strong organic base consisting of the ion formed when a weak organic acid is deprotinated in a basic solution. Alternatively a conjugate organic base can be formed by using a salt of the conjugate organic base ion that is dissassociated into the respective ions in solution. A source of conjugate organic base can be a weak organic acid, a salt of the conjudgate organic base, or any other composition that will result in the formation of the conjugate base ion when placed in the solution to be treated.

Without being bound to any theory, it is believed that the iron forms a complex with the strong organic conjugate base keeping the iron in a soluble form. Because standard photographic solution has a basic pH, the addition of a weak organic acid to such solution will result in the deprotonation of the weak organic acid to form the conjugate strong organic base. Similarly, the addition of a salt of the conjugate organic base to the solution will result in the disassociation of the salt to form the conjugate organic base in the solution. As such, it will be recognized that while the following description will focus on the use of a weak organic acid, the direct use of a salt of the corresponding strong organic base can alternatively be used.

While the method of the current invention should be effective regardless of the particular type of weak organic acid that is used, it is currently preferred to use citric acid, salicylic acid, ascorbic acid, or acetic acid. The most preferred weak organic acid is citric acid. When citric acid is added to a basic solution, such as standard photographic solution, it forms the conjugate strong base citrate. Similarly, when a powdered citrate is added to standard photographic solution, it forms citrate ions as well. Without being bound to any theory, it is currently believed that in a standard photographic solution the organic citrate reacts with iron (II) to form iron (III) citrate tridentate, which is soluble in the standard photographic solution. This complexing of the iron prevents the iron from forming a precipitate or sludge in the drain line downstream from the metal recovery canister.

The amount of weak organic acid that is used will vary based upon the amount of silver that is to be recovered from the chemical fluid. For standard photographic fluid the concentration of citrate in the solution should be from about 0.2 milimolar to about 78 milimolar. Below about 0.2 milimolar, there is insufficient conjugate organic base formed in the standard photographic solution to chelate or otherwise tie up all of the iron that becomes available after passing through the metal recovery canister. Amounts above 78 milimolar will still work, however, at this level there is approximately a ten fold excess of strong organic base in the standard photographic solution so no additional advantage will be obtained. In addition, the high amounts of strong organic base in solution are believed to interfere with the iron complexes and can result in the precipitation of iron. Testing has shown that it takes about 0.75 grams of powdered citrate in five gallons of a standard bleach fix solution to provide 0.2 milimolar of citrate in solution, which is sufficient to prevent any visual amount of iron precipitate after passing the solution through a metal recovery canister 20. It is preferred to use a concentration of about 1.6-5 and more preferred to use a concentration of about 3-5 milimolar of the conjugate base in the standard photographic solution.

If the weak organic acid or salt of the conjugate base is added directly to the standard photographic solution, the resulting concentration of the conjugate base in the solution can be calculated. Alternatively, the concentration of the strong conjugate base in the standard photographic solution can be determined by measuring the conductivity of the solution and using a calibration curve using known concentrations of the strong conjugate base. The temperature can affect the conductivity of the solution and therefore must either be held constant or accounted for in the calibration curve. Further, a single calibration curve cannot be used for the entire range of possible concentrations as the conductivity will not vary consistently over the entire range of possible concentrations. Therefore, it is preferred that a narrower calibration curve be used that is more focused on the particular range in which the concentration is expected to be located.

FIG. 1 depicts a common configuration involved in film processing. The various effluent streams from the film developing and paper process are added to holding tank 10 via one or more conduits 12. The combination of these various effluent streams results in what is considered standard photographic solution or Bleach/Fix solution. Periodically, the contents of holding tank 10 are removed for disposal via conduit 14. In some cases, pump 16 may be used to assist in removing the standard photographic solution from holding tank 10 and transporting it via conduits 14 and 16 to metal recovery canister 20. Metal recovery canister is composed of a canister wall 22 and a metal replacement core 26. Metal replacement core 26 may be a metal screen, iron filings, turnings, chips or powder, steel wool, a combination of the above, or any other metal replacement method now known or later developed. A preferred metal replacement core is disclosed in U.S. Pat. No. 6,096,209 which is incorporated herein for its disclosure of a particular metal recovery apparatus that is claimed in that patent as well as its general discussion of silver recovery in the background section. Regardless of the particular metal replacement core 26 that is used, the standard photographic solution enters metal recovery canister 20 via conduit 18, passes through the metal replacement core 26 where the dissolved silver is removed from solution, and then exit out of metal recovery canister 20 via conduit 28, where it may be directed to drain 30.

There are numerous methods for adding the weak organic acid to the standard photographic solution. One possible method involves adding the weak organic acid in powdered form to holding tank 10 before the solution is passed through the metal recovery canister. However, without a means to control the rate the weak organic acid dissolves into the standard photographic solution, the powdered weak organic acid would almost immediately dissolve completely and pass through the metal recovery canister 20. This would result in a concentration of conjugate organic base in the solution that is much higher than is required initially but quickly drops to concentrations that are not effective as photographic solution is removed from the holding tank to be passed through the metal recovery canister and new photographic solution is added to the holding tank. As a result, this method requires the frequent addition of the weak organic acid to the holding tank as additional photographic solution is added. While this can be accomplished any number of ways, it is currently preferred to use a method of additional that controls the rate the weak organic acid is dissolved into the standard photographic solution.

A second preferred method, which is generally depicted in FIG. 1, involves combining the weak organic acid and a binder to form a time release cake 24 or 24'. As shown in FIG. 1, time release cake 24 can be placed in metal recovery canister 20 or it can be located in holding tank 10, as shown by 24'. This allows the weak organic acid to slowly dissolve into the standard photographic solution over time, thereby maintaining a consistent concentration over time of the conjugate organic base in the standard photographic solution as it reaches the metal recovery canister. By controlling the amount and rate of dissolving of the weak organic acid, a cake size can be selected so that there will be sufficient amount of weak organic acid dissolving into the standard photographic solution over the entire life of the metal recovery canister. In this way, all the user has to do is to replace the metal recovery canister on the same schedule as they were previously doing in order to obtain the benefit of the current invention.

The cake 24 is preferably composed of a powdered weak organic acid or salt of the conjugate organic base along with a binder. Cake 24 can be formed by combining a powdered weak organic acid, such as citric acid, or a powdered salt of a conjugate organic base, such as a citrate salt, with a suitable binder, such as polyvinyl alcohol (PVA) binder, in an amount with sufficient solvent, such as nanopure water, to form a slurry. The most preferred binder is 98-99% hydrolyzed polyvinyl alcohol with a molecular weight of from about 146,000 to about 186,000 atomic mass units (amu). When using a powdered citrate and PVA to form cake 24, it is preferred that there is about 60% by weight of PVA and about 40% by weight of the citric acid.

The slurry is allowed to dry and then it is pressed at 8000 psi using a press and two dies to form pellets or a single cake. The dies preferably range in diameter from one-quarter inch to eight inches and are from about ¼ to about 1 inches thick. Preferably the cake 24 is formed of from about 350 to about 750 grams citric acid and sufficient PVA so the cake is from about 50% to about 60% PVA by weight. More preferably, the cake has a 40/60 ratio of citric acid to PVA. It is preferably pressed at from about 4000 to about 8000 psi to form a cake that is from about 3 to about 8 inches in diameter and from about ¼ to about 1 inches thick. This preferred cake 24 is expected to maintain a 3-5 milimolar concentration of citrate in standard photographic solution for at least 360 days, which roughly corresponds to about 1080 gallons of treated solution or about 150 troy ounces of silver recovered. This represents more than the standard life of a typical metal recovery canister 20.

A third preferred method is generally similar to the process depicted in FIG. 1, but with the alternate metal recovery canister 20 depicted in FIG. 2. This preferred method involves using a container 36 of a saturated solution 34 of the weak organic acid that contains a semipermeable membrane 32. In the third preferred embodiment, the container 36 is a bag formed entirely by semipermeable membrane 32. The semipermeable membrane 32 allows the saturated solution 34 of the weak organic acid to pass into the standard photographic solution that is contained in the remainder of the metal recovery canister 20 at a controlled rate. As discussed above, when the weak organic acid diffuses into the standard photographic solution, it becomes deprotonated to form the conjugate strong organic base. Therefore, the permeable membrane maintains the desired concentration of conjugate organic base in the metal recovery canister 20 to minimize and preferably prevent the formation of iron sludge and precipitate in conduit 28 and drain 30. Like the cake 24 depicted in the second preferred embodiment, the container 36 can alternatively be used in the holding tank 10.

The preferred material for semipermeable membrane 32 is a single layer of low density polyethylene (LDPE) of from about 2 thousands of an inch in thickness to about 4 thousands of an inch thick (2-4 mils thick). Container 6 is preferably a bag that is from about 8 to about 12 inches long, about 1 inch in diameter, is sealed on both end, and is formed entirely of semipermeable membrane 32.

Inside the container 36 is a concentrated solution 34 of the weak organic acid or a salt of the conjugate organic base. This can be a slurry or a saturated solution of the weak organic acid and a solvent, such as citric acid and nanopure water. Alternatively, it can be a slurry or a saturated solution of a powdered salt of the conjugate strong organic base in a solvent. Preferably, the concentrated solution 34 contains approximately 125 grams of powdered citrate and sufficient nanopure water to form a slurry (about 4 ounces).

Alternatively, the container 36 can be a portion of the wall 22 of the metal recovery canister 20 that is separated from the remainder of the metal recovery canister 20 by the semipermeable membrane 32. Similarly, container 36 can be formed in holding tank 10 by using a semipermeable membrane 32 to separate a portion of the holding tank 10 containing a concentrated solution 34 of weak organic acid from the remainder of the holding tank 10 that contains the standard photographic solution.

The semipermeable membrane 32 can be any material that allows the weak organic acid to slowly diffuse through the membrane 32 and into the standard photographic solution. The size and permeability of the semipermeable membrane 32 should be selected based upon the amount of the standard photographic solution that is being treated, the rate that new photographic solution is entering the holding tank 10 or metal recovery canister 20 in which the container 36 is located, and the concentration of the concentrated solution 34 of the weak organic acid. It is preferable to maintain a concentration of at least approximately 0.2 milimolar of the conjugate organic base in the photographic solution in order to completely prevent any iron from precipitating or forming a sludge. More preferably a concentration of at least approximately 1.6 milimolar and most preferably a concentration of 3-5 milimolar of the conjugate organic base is maintained in the photographic solution.

A fourth preferred embodiment, which is a variation of the third preferred embodiment, is depicted in FIG. 3, which shows an alternate metal recovery canister 20. Container 36 containing the saturated solution 34 of a source of a conjugate organic base is a separate container made up of container wall 38 with semipermeable membrane 32 extending across an opening in container wall 38. Container wall 38 may preferably be made of plastic or glass or any other material that is effectively impermeable to the concentrated solution 34 of weak organic acid. While only a single opening in container wall 38 is shown, one of skill in the art will recognize that the size and number of openings can be optimized to provide a sufficient surface area of semipermeable membrane 32 to provide the desired rate of diffusion of the weak organic acid into the standard photographic solution. However, this embodiment is currently less preferred than forming the entire container 36 out of the semipermeable membrane 32, because when LDPE is used as semipermeable membrane 32 container 36 would have to be significantly larger in order for there to be sufficient surface area of semipermeable membrane 32 to maintain the preferred concentration of conjugate organic base in the standard photographic solution.

Various embodiments of the current invention may be better understood by reference to the following examples.

Example 1

As a control, a sample of 5 gallons of a standard photographic solution, commerically available under the name Bleach/Fix and that can be obtained from any photo processor. The standard photographic solution was found to contain 800 ppm of dissolved silver as measured by atomic absorption. The sample was passed through a TM-8 metal recovery canister that is commercially available under the name Turbit Miner™ from Academy located in Albuquerque, N. Mex. The solution exiting the canister had about 2800 ppm of iron precipitate. The discharge from the canister usually contains between 2500 and 3500 ppm of iron, which is picked up from the steel wool in the canister as the silver is recovered. While a small amount of this will be in solution, the vast majority of this iron will precipitate out of solution.

Example 2

The process of Example 1 was repeated, expect that 288 grams of a powdered citrate, which the MSDS identified as anhydrous citric acid, was added to the 5 gallons of photographic solution prior to passing it through the metal recovery canister. This resulted in a concentration of about 78 millimolar of citrate in the standard photographic solution. The solution exiting the canister had 2.3 ppm of precipitate iron which created a slightly visible precipitate. The remaining iron is now tied up in soluble iron complexes.

Example 3

The process of Example 1 was repeated, except 6 grams of a powdered citrate was added to the 5 gallons of photographic solution. This resulted in a concentration of about 1.6 millimolar of citrate in the standard photographic solution. The solution exiting the canister had no visual amount of precipitated iron.

Example 4

The process of Example 1 was repeated, expect that 0.75 grams of a powdered citrate was added to the 5 gallons of standard photographic solution prior to passing it through the metal recovery canister. This resulted in a concentration of about 0.2 millimolar of citrate in the standard photographic solution. The solution exiting the canister had no visual amount of precipitated iron.

As can been seen in Examples 2-4, an amount of from about 0.75 to about 288 grams of powdered citrate added to standard photographic solution will result in a concentration of citrate of from about 0.2 to about 78 milimolar, which is sufficient to prevent the precipitation of iron following a silver recovery process. At the high end of 78 milimolar you can begin to see a visual amount of iron precipitate forming as, without being bound to any theory, it is believed that the higher concentrations of citrate in solution can interfere with the formation of the soluable iron complexes. As a result, it is currently preferred to maintain a concentration of the conjugate strong organic base of from about 0.2 to about 78 milimolar in the standard photographic solution.

Example 5

A cake according to the second preferred embodiment was formed using 22 grams of citric acid and 33 grams of PVA to form a 60/40 ratio by weight of citric acid to PVA. The PVA and citric acid were combined with sufficient nanopure water to form a slurry so the citric acid and PVA were thoroughly mixed. The slurry was allowed to dry at room temp. The dried slurry is pressed at 8000 psi using a press and die to form a cake having a diameter of four inches and a height of 3/8 inch. The compressed cake was placed in a sample of 1 gallon of the standard photographic solution used in Exhibit 1. The conductivity of the sample solution was measured over time to determine the concentration of citrate in the solution. While the test is ongoing, it has been found that the concentration of citrate in the standard photographic solution has remained within the range of 3-5 milimolar for over 10 days. The size and weight of the cake varied because as citrate is released from the cake into the solution, some solution is absorbed by the cake. As such there was little measurable change in the size and weight of the cake over a period of ten days.

Example 6

An osmotic pump according to the third preferred embodiment was prepared using 40 grams of a powdered citrate with 40 ml nanopure water to form a slurry. The resulting slurry was placed in a eight inch long bag composed of a single layer of 4 mils thick LDPE that is available from U.S. Plastics located in Lima, Ohio and that was sealed on both ends. The bag was then placed in a sample of 5 gallons of the standard photographic solution from Example 1. The conductivity of the sample solution was measured over time to determine the concentration of citrate in the solution. Over a period of four months, the concentration of citrate in the standard photographic solution has remained above 1.6 milimolar.

Example 7

An osmotic pump according to the fourth preferred embodiment was prepared using 40 grams of citric acid with 40 ml nanopure water to form a slurry/saturated solution. The resulting slurry or solution was placed in a high density polyethylene (HDPE) container having a length of three inches and a diameter of one inch with a one inch diameter open end. A membrane was placed over the open top of the container that was composed of a single layer of flat laying 4 mil LDPE that is available from U.S. Plastics located in Lima, Ohio. The container was then placed in a sample of 1 gallon of the standard photographic solution from Example 1. The concentration of the citrate in the solution was attempted to be measured via the pH of the solution. While it was unsuccessful in determining the concentration of the citrate, it was confirmed that there was citrate in the standard photographic solution thus confirming this method of adding a weak organic acid or salt of the conjugate base to standard photographic solution.

The above description of certain embodiments are made for the purposes of illustration only and are not intended to be limiting in any manner. Other alterations and modifications of the preferred embodiment will become apparent to those of ordinary skill in the art upon reading the disclosure, and it is intended that the scope of the invention disclosed herein be limited only by the broadest interpretation of the appended claims to which the inventor is legally entitled.

What is claimed is:

1. A method of reducing the amount of iron in a chemical fluid that forms a sludge or a precipitate during the recovery of silver from the chemical fluid comprising the steps of:

providing a chemical fluid containing an amount of silver;

selecting a source of a conjugate organic base;

contacting the source of a conjugate organic base with the chemical fluid;

recovering the silver from the chemical fluid using a metal replacement medium containing iron;

wherein the source of a conjugate organic base is formed in a time release cake further comprising a binder; and wherein the binder is a polyvinyl alcohol and the ratio of the binder to the source of a conjugate organic base in the time release cake is about 60:40 by weight.

2. The method of claim 1 wherein the chemical fluid is a standard photochemcial solution and the source of conjugate organic base provides a concentration of conjugate organic base in the standard photochemical solution that is from about 0.2 to about 78 milimolar.

3. The method of claim 2 where the concentration of conjugate organic base is greater than about 1.6 milimolar.

4. The method of claim 3 wherein the concentration of conjugate organic base is from about 3 to about 5 milimolar.

5. The method of claim 1 wherein the source of the conjugate organic base is selected from the group consisting of a weak organic acid and a salt of a conjugate organic base.

6. The method of claim 5 wherein the source of the conjugate organic base is citric acid.

7. The method of claim 5 wherein the source of the conjugate organic base is a citrate salt.

8. The method of claim 1 wherein the time release cake provides a concentration of conjugate organic base in the chemical fluid that is from about 1.6 to about 5 milimolar over a period of time.

9. The method of claim 1 wherein the time release cake comprises:

about 350 to about 750 grams of a powdered citrate salt;

an amount of a polyvinyl alcohol binder that has a molecular weight from about 146,000 to about 186,000 and is above about 98% hydrolyzed that is sufficient to provide a ratio of binder to powdered citrate salt that is about 60:40;

wherein the time release cake is pressed at from about 4000 to about 8000 psi; and wherein the time release cake provides a concentration of the conjugate organic base in the chemical fluid of from about 1.6 to about 5 milimolar over a period of time that is at least 10 days.

10. A method of reducing the amount of iron in a standard photographic solution that forms a sludge or a precipitate during the recovery of silver from the standard photographic solution comprising the steps of:

providing a standard photographic solution containing an amount of silver;

selecting a source of a conjugate organic base;

contacting the source of a conjugate organic base with the standard photographic solution to provide a concentration of from about 0.2 to about 78 milimolar of conjugate organic base in the standard photographic solution;

recovering the silver from the chemical fluid using a metal replacement medium containing iron;

wherein the source of a conjugate organic base is formed in a time release cake further comprising a binder; and wherein the binder is a polyvinyl alcohol and the ratio of the binder to the source of a conjugate organic base in the time release cake is about 60:40 by weight.

11. The method of claim 10 wherein the concentration is from about 0.2 to 5 milimolar.

12. The method of claim 10 wherein the source of the conjugate organic base is selected from the group consisting of a weak organic acid and a salt of a conjugate organic base.

13. The method of claim 12 wherein the source of conjugate organic base is citric acid.

14. The method of claim 12 wherein the source of conjugate organic base is a citrate salt.

15. The method of claim 10 wherein the time release cake maintains a concentration from about 0.2 to about 5 milimolar of conjugate organic base in the standard photographic solution for a period of at least 10 days.

16. The method of claim 10 wherein:

the time release cake comprises about 350 to about 750 grams of a powdered citrate salt;

the binder is a polyvinyl alcohol having a molecular weight from about 146,000 to about 186,000 and that is above about 98% hydrolyzed;

the ratio of binder to powdered citrate salt is about 60:40;

the time release cake is pressed at from about 4000 to about 8000 psi; and the time release cake provides a concentration of the conjugate organic base in the standard photographic solution of from about 1.6 to about 5 milimolar over at least 10 days.

17. A method of reducing the amount of iron in a chemical fluid that forms a sludge or a precipitate during the recovery of silver from the chemical fluid comprising the steps of:

providing a chemical fluid containing an amount of silver;

selecting a source of a conjugate organic base;

contacting the source of a conjugate organic base with the chemical fluid;

recovering the silver from the chemical fluid using a metal replacement medium containing iron;

wherein the source of conjugate organic base is located inside a container comprising a semipermeable membrane that maintains a concentration of conjugate organic base in the chemical fluid over a period of time; and wherein the semipermeable membrane is low density polyethylene that is from about 2 to about 4 thousands of an inch thick.

18. The method of claim 17 wherein the container provides a concentration of the conjugate organic base in the chemical fluid of from about 0.2 to about 78 millimolar over the period of time.

19. The method of claim 17 wherein the container is a bag made of the semipermeable membrane.

20. The method of claim 19 wherein the bag:

is from about 8 to about 12 inches long;

contains about 125 grams of a powdered citrate salt that is the source of the conjugate organic base;

contains at least enough water to form a slurry with the powdered citrate salt; and wherein the concentration of conjugate organic base in the chemical fluid is from about 1.6 to about 5 milimolar and the period of time is at least four months.

21. The method of claim 17 wherein:

the chemical fluid is a standard photographic solution;

wherein the concentration of the conjugate organic base in the chemical fluid over a period of time is from about 0.2 to about 78 milimolar; and the source of the conjugate organic base is selected from the group consisting of a weak organic acid and a salt of a conjugate organic base.

22. The method of claim 21 wherein the container is a bag composed of the semipermeable membrane.

23. The method of claim 22 wherein the bag:

is from about 8 to about 12 inches long;

contains about 125 grams of powdered citrate salt that is the source of conjugate organic base;

contains at least enough water to form a slurry with the powdered citrate salt;

provides a concentration of the conjugate organic base in the standard photographic solution of from about 1.6 to about 5 milimolar over at least four months.

* * * * *